Patented June 16, 1953

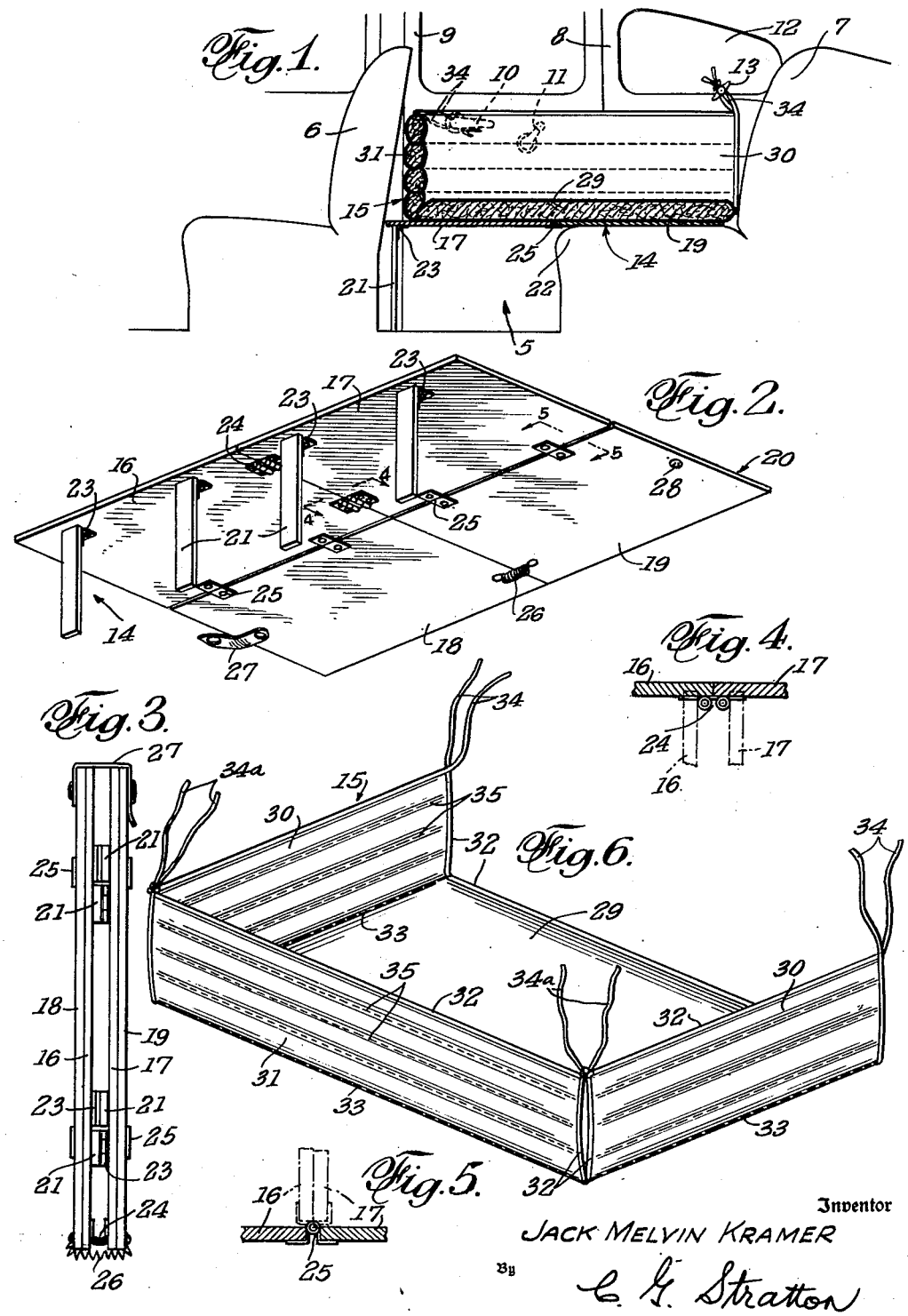

2,641,773

UNITED STATES PATENT OFFICE 2,641,773

BABY PEN FOR AUTOMOBILES

Jack M. Kramer, Los Angeles, Calif.

Application August 5, 1950, Serial No. 177,953

3 Claims. (Cl. 5—94)

This invention relates to a collapsible baby pen for automobiles.

An object of the present invention is to provide a convenient and safe baby pen that is adapted to be quickly positioned in the rear passenger compartment of an automobile to provide an enclosed area in which one or more children may play, sleep, etc., in safety.

Another object of the invention is to provide a baby pen for the purpose intended that cooperates with the back of the rear seat of an automobile to form a padded enclosure for use by children, the same, thereby, cushioning road shocks.

Another object of the invention is to provide a baby pen of the character indicated that has padded upstanding walls which guard the occupants of the pen from protruding hardware in the rear passenger compartment of an automobile, said walls overstanding such hardware to conceal the same and, thereby, obviate manipulation by children occupying the pen.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a cross-sectional view of a baby pen according to the present invention, the same being shown as erected in the rear compartment of an automobile.

Fig. 2 is a perspective view of a foldable support that comprises one component of the baby pen.

Fig. 3 is an enlarged edge view showing said support in folded condition.

Figs. 4 and 5 are further enlarged fragmentary detail sectional views, as taken on the respective lines 4—4 and 5—5 of Fig. 2.

Fig. 6 is a perspective view of a pad unit arranged on the foldable support, the same comprising the other component of the baby pen.

Fig. 1 shows the rear compartment 5 of an automobile by way of example, said compartment being defined by front seat 6 and rear seat 7, front to back, and side walls 8, side to side. In the usual manner, access to the compartment is afforded by doors 9 in walls 8. Also, conventionally, said doors each have an operating handle 10 and a crank 11 for manipulating the window. Each side wall 8 is also provided with a sliding or swinging window 12 that may be manipulated as by a knob 13 or the like. This knob has little protrusion and may be disregarded as a hazard to a child in the compartment 5. However, handle 10 and crank 11 offer considerable hazard to a child that may be thrown thereagainst.

The present baby pen is devised to be placed in the compartment 5, the same generally comprising support 14 as one component, and pad unit 15 as the other.

As contemplated, support 14 comprises a foldable unit essentially composed of four rectangular panels 16, 17, 18 and 19 which, when open, form a support base or platform 20 of a size that substantially fills compartment 5. Accordingly, the length of said platform is somewhat less than the interior width of compartment 5, and the width, somewhat less than the distance between the back of front seat 6 and the front face of the back of rear seat 7. The platform 20 is provided with support legs 21 which support the forward portion of the platform from the floor of the automobile, the rearward portion of said platform resting on the seat cushion 22 of rear seat 7. Adjustability, as to length, may be provided for legs 21 so that the same may conform to cushions 22 of different heights.

The panels 16 to 19 are so inter-connected that the same can be folded, as in Fig. 3, to form a four-ply relatively small and flat unit that can be easily handled and stored. Since legs 21 are foldable on hinges 23 to lie flat against the respective panels 16 and 17 that carry them, and it is desirable that said legs be folded in between said panels 16 and 17, hinges 24, shown best in Fig. 4, are provided. Said hinges are of the double-hinge articulated type that enables folding of panels 16 and 17 in spaced relation, as in Fig. 3, so that the folded-down legs 21 may be accommodated in the space between said folded panels. The legs 21 are so spaced that the legs carried by one panel reside alongside of the legs carried by the other panel. Thus, the space between panels 16 and 17, when folded, need only be large enough to accommodate one leg thickness, as shown.

Since it is preferred that the upper surface of platform 20 be substantially without projections that may snag on pad 15 supported thereon, the hinges 25 connecting the panels 16 and 17 with panels 18 and 19, respectively, are formed, as in Fig. 5, to be fastened to the under face of the panels with the hinge pin residing between the edges of the respective panels connected by the hinges.

The panels 18 and 19 are also inter-connected. Since panels 18 and 19 separate considerably because they are folded outside of panels 16 and 17, the connection between the former panels may comprise a coiled tension spring 26 that will stretch according to the degree of separation. Instead of said spring, a hook and eye may be employed that connect the panels, when open and are disengaged when the panels are folded.

To retain the folded condition of the platform, a strap 27 carried by panel 18 has snap engagement with a fastener 28 on panel 19.

In use, from a folded condition, the unit 14 is introduced into compartment 5 with hinges 25 directed forward. The folded unit will be placed on seat 22 and, depending on which side of the automobile the same is placed, either panel 18 or panel 19 will rest on said seat. Now the unit is opened on hinges 24 so that both panels 18 and 19 rest on said seat. Finally, panels 16 and 17 (now open) are swung up and out, and the legs 21 are swung down to achieve the open position of Figs. 1 and 2.

The pad unit 15 is generally T-shaped when flat and, in this condition, can be rolled up or folded, as desired, to occupy a minimum of space for easy handling and storage. Said unit comprises a padded bottom 29, side flaps 30, and a front flap 31. Binding tapes 32 bind the outer layers of fabric between which padding is provided in the usual manner. Said layers of fabric may be water-proof, if desired. The flaps 30 and 31 are designed to hinge on the respective edges of bottom 29 to which they join, a line of stitching 33 defining each such hinge. Consequently, flaps 30 may be upwardly bent to form a side wall and, similarly, flap 31 may be bent to form a front wall, as in Fig. 1. The binding tapes 32 are extended to form tie strings 34, as best seen in Fig. 6.

By first tying strings 34a together on the opposite sides of the unit, the same is formed as a three-walled enclosure that is positioned on platform 20, as shown in Fig. 1. Now, the strings 34 are tied to the automobile hardware most available as, for instance, door handle 10 and knob 13, on both sides of the automobile, and the pad unit is held in place. It will be noted that rear seat back 7 forms the fourth wall of the pen, although, if a fourth wall is desired, the same may be provided in the same manner as above described.

It will be seen that flaps 30 constitute walls of sufficient height to cover protruding hardware as herein contemplated. The quilting stitching 35 shown on flaps 30 and 31, is optional and is employed to more securely hold the padding in place in said flaps.

While the invention that has been illustrated and described is now regarded as the preferred embodiment, the construction is, of course, subject to modifications without departing from the spirit and scope of the invention. It is, therefore, not desired to restrict the invention to the particular form of construction illustrated and described, but to cover all modifications that may fall within the scope of the appended claims.

Having thus described my invention, what I claim and desire to secure by Letters Patent is:

1. In a baby pen of the character described, a foldable support comprising a platform composed of four rectangular panels, hinges connecting two of said panels and disposed for folding of said two panels with their under faces directed toward each other, foldable legs carried by said two panels, and, when folded, residing between the said two folded panels, and hinges connecting the other two panels to the first two panels and disposed for folding of said other two panels against the upper faces of the first two panels.

2. In a baby pen of the character described, a foldable support comprising a platform composed of four rectangular panels, hinges connecting two of said panels and disposed for folding of said two panels with their under faces directed toward each other, foldable legs carried by said two panels and, when folded, residing between the said two folded panels, hinges connecting the other two panels to the first two panels and disposed for folding of said other two panels against the upper faces of the first two panels, and an extensible connection between the adjacent edges of said other two panels.

3. In a baby pen of the character described, a foldable support comprising a platform composed of four rectangular panels, hinges connecting two of said panels and disposed for folding of said two panels with their under faces directed toward each other, foldable legs carried by said two panels and, when folded, residing between the said two folded panels, hinges connecting the other two panels to the first two panels and disposed for folding of said other two panels against the upper faces of the first two panels, an extensible connection between the adjacent edges of said other two panels, and separable fastener means connecting the opposite ends of said other two panels when the four mentioned panels are folded on their respective hinges.

JACK M. KRAMER.

References Cited in the file of this patent

UNITED STATES PATENTS

| Number | Name | Date |
|---|---|---|
| 1,208,053 | Van Allen | Dec. 12, 1916 |
| 1,252,242 | Cornwell | Jan. 1, 1918 |
| 1,333,924 | Kay | Mar. 16, 1920 |
| 1,577,232 | Holly | Mar. 16, 1926 |
| 1,581,858 | Musgrave | Apr. 20, 1926 |
| 2,253,024 | Farrand | Aug. 19, 1941 |
| 2,429,350 | Farrand | Oct. 21, 1947 |
| 2,433,504 | Zimmerman | Dec. 30, 1947 |